US008661302B2

(12) United States Patent
Gorti et al.

(10) Patent No.: US 8,661,302 B2
(45) Date of Patent: Feb. 25, 2014

(54) ENHANCED DEBUG/TEST CAPABILITY TO A CORE RESET PROCESS

(75) Inventors: Atchyuth K. Gorti, Austin, TX (US);
Salih Hamid, Austin, TX (US); Amit Pandey, Austin, TX (US); William Yang, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 635 days.

(21) Appl. No.: 12/948,443

(22) Filed: Nov. 17, 2010

(65) Prior Publication Data

US 2012/0124424 A1    May 17, 2012

(51) Int. Cl.
*G01R 31/28* (2006.01)
*G06F 11/00* (2006.01)

(52) U.S. Cl.
USPC .............................................. 714/726; 714/36

(58) Field of Classification Search
None
See application file for complete search history.

(56) References Cited

U.S. PATENT DOCUMENTS

| 5,263,168 | A  | * | 11/1993 | Toms et al. ...................... 713/1 |
| 5,875,294 | A  | * | 2/1999  | Roth et al. ..................... 714/39 |
| 6,035,422 | A  | * | 3/2000  | Hohl et al. ..................... 714/35 |
| 6,272,626 | B1 | * | 8/2001  | Cobbett ........................... 713/2 |
| 6,463,531 | B1 | * | 10/2002 | Aguilar et al. .................... 713/2 |
| 7,395,528 | B1 | * | 7/2008  | Cantrill ......................... 717/128 |
| 8,060,785 | B2 | * | 11/2011 | Lin et al. ........................ 714/36 |
| 8,103,496 | B1 | * | 1/2012  | Roe et al. ........................ 703/28 |
| 2004/0162979 | A1 | * | 8/2004 | Reasor et al. .................... 713/2 |
| 2006/0230316 | A1 | * | 10/2006 | Lu et al. ......................... 714/36 |
| 2009/0240981 | A1 | * | 9/2009 | Tra et al. ........................ 714/13 |
| 2009/0257481 | A1 | * | 10/2009 | Salcido et al. ................. 375/224 |

* cited by examiner

*Primary Examiner* — Gabriel Chu
(74) *Attorney, Agent, or Firm* — Williams Morgan, P.C.

(57) ABSTRACT

A method and apparatus to improve the efficiency of debugging a processor is provided. Also provided is a computer readable storage device encoded with data for adapting a manufacturing facility to create an apparatus. The method includes receiving a first test data, which identifies a state of a state machine, wherein the state machine performs reset and initialization operations for a processor. The method also includes halting the state machine in the state identified by the first test data upon reaching the state.

19 Claims, 8 Drawing Sheets

ENHANCED DEBUG/TEST CAPABILITY TO A CORE RESET PROCESS

BACKGROUND

1. Field of the Invention

Embodiments of this invention relate generally to computers, and, more particularly, to a method and apparatus to improve the efficiency of debugging a processor.

2. Description of Related Art

System-on-chip devices (SOCs) are well-known, These devices generally include a processor, one or more modules, bus interfaces, memory devices, and one or more system buses for communicating information. When designing, testing, and checking the microcomputer, it is useful to operate the SOC in a mode so that problems with programs executing on the microcomputer can be identified and corrected. This process of problem identification and correction is known as "debugging." Because multiple modules and their communications occur internally to the chip, access to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software, which accesses a processor through serial communications.

While these debugging methods have been proven effective, they have not been very useful for issues that may arise during the early stages of the microcomputer's bring-up process. In this case, it is often difficult to quickly determine a root cause of a problem due to the limited visibility to the SOC during this stage of testing. As a result, test engineers are generally limited to a trial and error approach, where the engineer tries a variety of seemingly random approaches to root cause the problem with limited substantive real guidance.

SUMMARY OF EMBODIMENTS OF THE INVENTION

In one embodiment of the present invention, a method is provided. The method includes transmitting a first test data, which identifies a first state of a state machine, wherein the state machine performs reset and initialization operations for a processor. The method also includes receiving a second test data, which identifies a second state of the state machine. The method further includes determining that the state machine has halted if the first test data is equal to the second test data.

In another embodiment of the present invention, another method is provided. The method includes receiving a first test data, which identifies a state of a state machine, wherein the state machine performs reset and initialization operations for a processor. The method also includes halting the state machine in the state identified by the first test. data upon reaching the state.

In yet another embodiment of the present invention, an apparatus is provided. The apparatus includes a processor configured to receive a first test data, which identifies a state of a state machine, wherein the state machine performs reset and initialization operations for a processor. The processor is also configured to halt the state machine in the state identified by the first test data upon reaching the state.

In yet another embodiment of the present invention, a computer readable storage medium encoded with data that, when implemented in a manufacturing facility, adapts the manufacturing facility to create an apparatus is provided. The apparatus provided includes a processor configured to receive a first test data, which identifies a state of a state machine, wherein the state machine performs reset and initialization operations for a processor. The processor is also configured to halt the state machine in the state identified by the first test data upon reaching the state.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
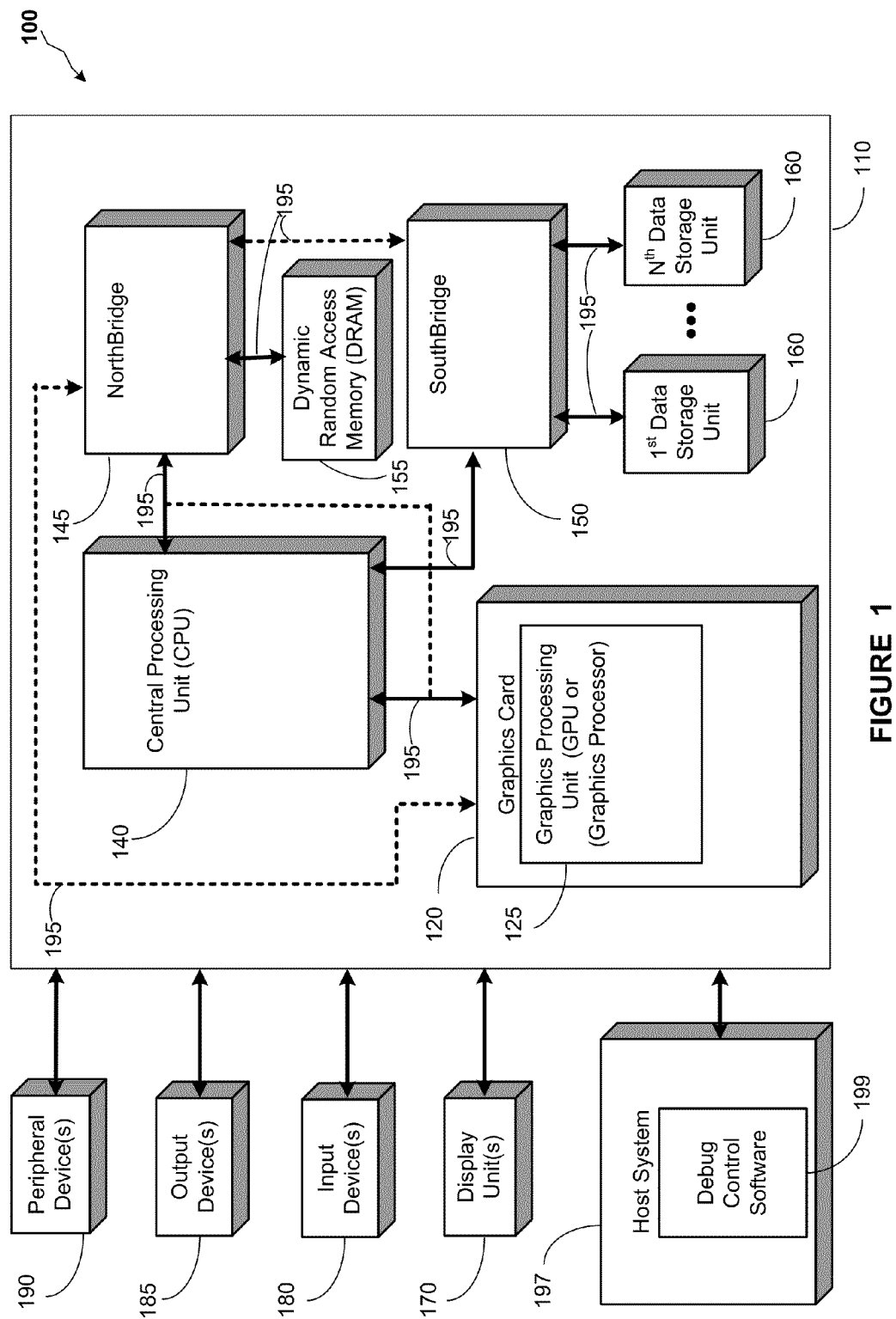
FIG. 1 schematically illustrates a simplified block diagram of a computer system according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The disclosed subject matter will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for providing a debugging scheme to provide visibility into a processor's reset process, and thereby, improving the efficiency of debugging the processor. Embodiments of the system described herein can identify a present state of a reset and initialization state machine of the processor using a serial interface (e.g., an IEEE-1149.1 compliant JTAG interface) and also pause the state machine in any given state. In doing so, a tester may be able to determine which states of the reset and initialization state machine have executed correctly.

Turning now to FIG. 1, a block diagram of an exemplary computer system 100, in accordance with an embodiment of the present invention, is illustrated. In various embodiments the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices, Inc. ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the graphics card 120 may contain a graphics processing unit (GPU) 125 used in processing graphics data. In various embodiments the graphics card 120 may be referred to as a circuit board or a printed circuit board or a daughter card or the like.

In one embodiment, the computer system 100 includes a central processing unit (CPU) 140, which is connected to a northbridge 145. The CPU 140 and the northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips." Alternative embodiments that alter the arrangement of various components illustrated as forming part of main structure 110 are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and the southbridge 150 may be on the same chip in the computer system 100, or the northbridge 145 and the southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, the northbridge 145, the southbridge 150, the graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, peripheral devices 190 and/or a host system 197. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device that can be coupled to a computer: a CD/DVD drive capable of reading and/or writing to physical digital media, a USB device, Zip Drive, external floppy drive, external hard drive, phone and/or broadband modem, router/gateway, access point and/or the like. The host system 197 may be used to execute debug control software 199 for transferring high-level commands and controlling the extraction and analysis of debug information generated by the CPU 140. The host system 197 and the computer system 100 may be communicatively coupled via a USB link, PCI link, Ethernet link, or any other similar standardized serial port link. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
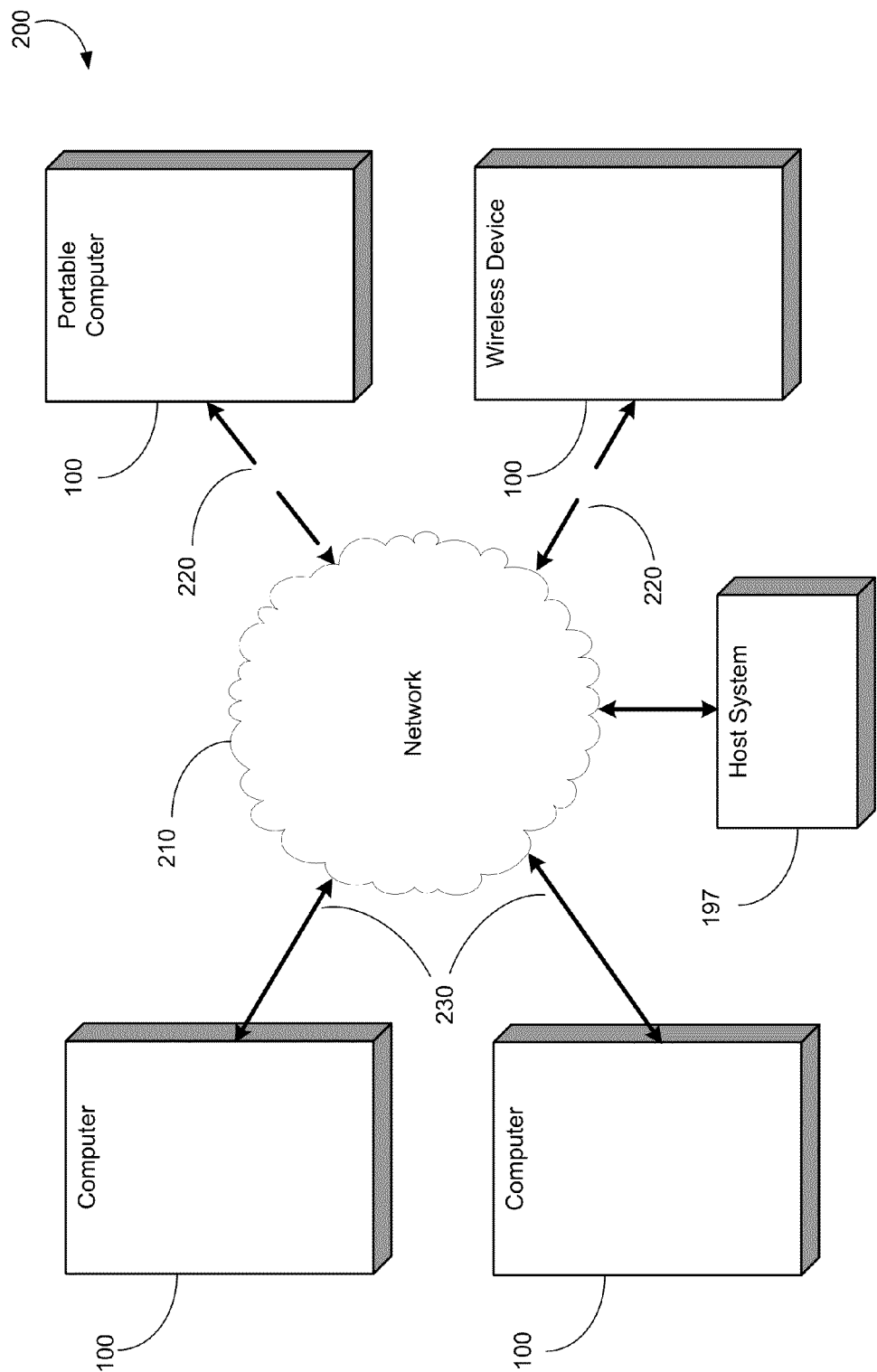
FIG. 2 shows a simplified block diagram of multiple computer systems connected via a network according to one embodiment.

Turning now to FIG. 2, a block diagram of an exemplary computer network 200, in accordance with an embodiment of the present invention, is illustrated. In one embodiment, any number of computer systems 100 and/or host systems 197 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 that are connected to the network 200 via network infrastructure 210 may be a personal computer, a laptop computer, a netbook computer, a handheld computer, a mobile device, a telephone, a personal data assistant (PDA), a server, a mainframe, a work terminal, or the like. The number of computers depicted in FIG. 2 is exemplary in nature; in practice any number of computer systems 100 maybe coupled/connected using the network 200.

Figure 3:
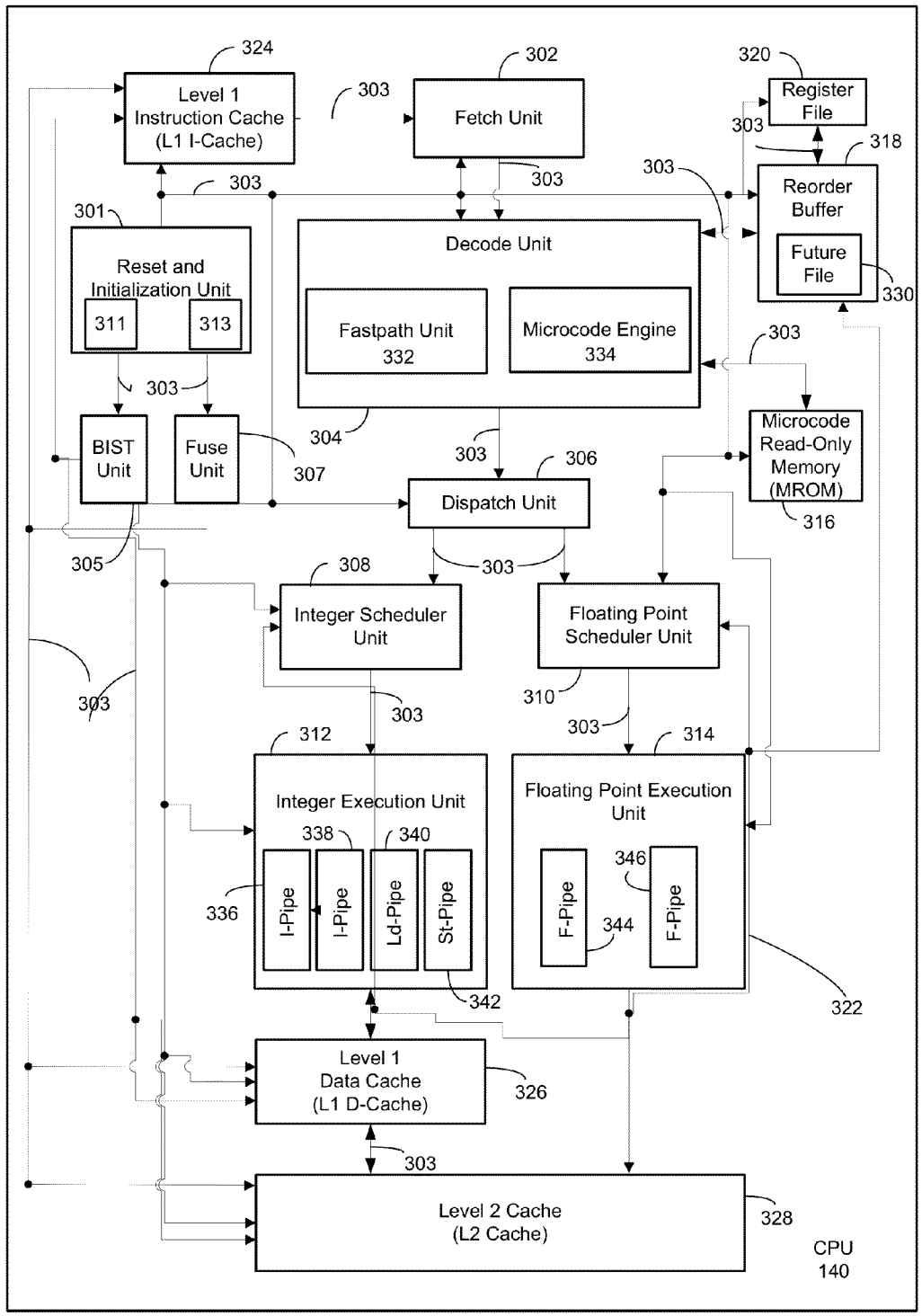
FIG. 3 illustrates an exemplary detailed representation of one embodiment of the central processing unit provided in FIGS. 1-2 according to one embodiment.

Turning now to FIG. 3, a diagram of an exemplary implementation of a processor, CPU 140, in accordance with an embodiment of the present invention, is illustrated. The CPU 140 includes a CPU core 302. The CPU core 302 may be used to execute instructions and/or manipulate data stored in the the memory 155 (shown in FIG. 1). The CPU 140 also implements a hierarchical (or multilevel) cache system that may be used to speed access to the instructions and/or data by storing selected instructions and/or data in the caches. However, persons of ordinary skill in the art having benefit of the present disclosure should appreciate that alternative embodiments of the computer system 100 may implement different configurations of the CPU 140, such as configurations that use external caches.

The illustrated cache system includes a level 2 (L2) cache 328 for storing copies of instructions and/or data that are stored in the main memory 155. In the illustrated embodiment, the L2 cache 328 is 16-way associative to the main memory 155 so that each line in the main memory 155 can potentially be copied to and from 16 particular lines (which are conventionally referred to as "ways") in the L2 cache 328. However, persons of ordinary skill in the art having benefit of the present disclosure should appreciate that alternative embodiments of the main memory 155 and/or the L2 cache 328 can be implemented using any associativity. Relative to the main memory 155, the L2 cache 328 may be implemented using smaller and faster memory elements. The L2 cache 328 may also be deployed logically and/or physically closer to the CPU core 302 (relative to the main memory 155) so that information may be exchanged between the CPU core 155 and the L2 cache 328 more rapidly and/or with less latency.

The illustrated cache system also includes an L1 cache 322 for storing copies of instructions and/or data that are stored in the main memory 155 and/or the L2 cache 328. Relative to the L2 cache 328, the L1 cache 324 may be implemented using smaller and faster memory elements so that information stored in the lines of the L1 cache 324 can be retrieved quickly by the CPU 140. The L1 cache 324 may also be deployed logically and/or physically closer to the CPU core 302 (relative to the main memory 155 and the L2 cache 328) so that information may be exchanged between the CPU core 302 and the L1 cache 324 more rapidly and/or with less latency (relative to communication with the main memory 155 and the L2 cache 328). Persons of ordinary skill in the art having benefit of the present disclosure should appreciate that the L1 cache 322 and the L2 cache 328 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 322 is separated into level 1 (L1) caches for storing instructions and data, which are referred to as the L1-I cache 324 and the L1-D cache 326. Separating or partitioning the L1 cache 322 into an L1-I cache 324 for storing only instructions and an L1-D cache 326 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 324 are replaced with instructions from the L2 cache 328 and the lines in the L1-D cache 326 are replaced with data from the L2 cache 328. However, persons of ordinary skill in the art should appreciate that alternative embodiments of the L1 cache 322 may not be partitioned into separate instruction-only and data-only caches 324, 326. The caches 322, 324, 326, 328 can be flushed by writing back modified (or "dirty") cache lines to the main memory 155 and invalidating other lines in the caches 322, 324, 326, 328.

Referring still to FIG. 3, the CPU 140 may also include a reset and initialization unit 301, which may perform various reset and initialization steps for the CPU 140. In one embodiment, the reset and initialization unit 301 may include a reset and initialization state machine 311. The reset and initialization state machine 311 may receive a PowerUp signal 636 (shown in FIG. 6), a ColdReset signal and/or a WarmReset signal 638 (both shown in FIG. 6). An active PowerUp signal 636 may indicate that voltages supplied to the CPU 140 from a common voltage plan are stabilized to a specified voltage. An active ColdReset signal 638 may indicate that a reset occurred during system initialization (e.g., a power-on sequence). An active WarmReset signal 638 may indicate that a reset occurred while the CPU 140 was already running (i.e., the CPU 140 has already received power). A WarmReset signal 638 is generally initiated through a software routine, through hardware or both.

Upon receiving an active PowerUp 636 or reset signal, the reset and initialization state machine 311 may perform various reset and initialization steps for the CPU 140. For example, the reset and initialization state machine 311 may generate a reset signal to each of the functional sub-blocks of the CPU 140. The reset and initialization state machine 311 may also generate various "Go" signals to various units in the CPU 140 (e.g., the BIST unit 305 and the fuse unit 307) to initiate other initialization steps. The "Go" signals may also assist in transitioning between the various states of the reset and initialization state machine 311. The reset and initialization state machine 311 may also monitor the initialization sequence of the CPU 140. For example, the reset and initialization state machine 311 may wait for various "Done" signals (received from various units of the CPU 140 (e.g., the BIST unit 305 and the fuse unit 307)) during each step of the initialization sequence. Once the reset and initialization sequence has ended, the reset and initialization state machine 311 may become inactive (i.e., the clock to the reset and initialization state machine 311 may be gated off). The reset and initialization state machine 311 may become active once the reset signal (i.e., the WarmReset signal 638 or ColdReset signal 638) has been re-asserted. The various reset and initialization steps are further illustrated with respect to FIG. 6.

The reset and initialization unit 301 may also include an interface 313 for facilitating with testing and debugging of the reset and initialization state machine 311. The host system 197 (illustrated in FIG. 1) may perform debug operations by communicating with the reset and initialization unit 301 using the interface 313. In one embodiment, the interface 311 may include an IEEE-1149.1 compliant JTAG interface. In this case, the host system 197 may also include an IEEE-1149.1 compliant JTAG interface to communicate with the reset and initialization unit 301.

The CPU 140 may also include a BIST unit 305, which may perform various BISTs for the caches 322, 324, 326, 328 that may be included in the CPU 140. As shown, in one embodiment, the BIST unit 305 may be a functional sub-block of the CPU 140. In another embodiment, a BIST unit may be located in some or all of the caches 322, 324, 326, 328 of the CPU 140.

The CPU 140 may also include a fuse unit 307, which may perform fuse operations such as blowing fuses to activate redundant columns and/or rows to replace defective column and/or rows of the caches 322, 324, 326, 328 of the CPU 140. The fuse unit 307 may also blow other fuses to change other configurations (e.g., the duty cycle) for the CPU 140. As shown, in one embodiment, the fuse unit 307 may be a functional sub-block of the CPU 140. In another embodiment, the fuse unit 307 may be located in some or all of the caches 322, 324, 326, 328 of the CPU 140.

Figure 4:
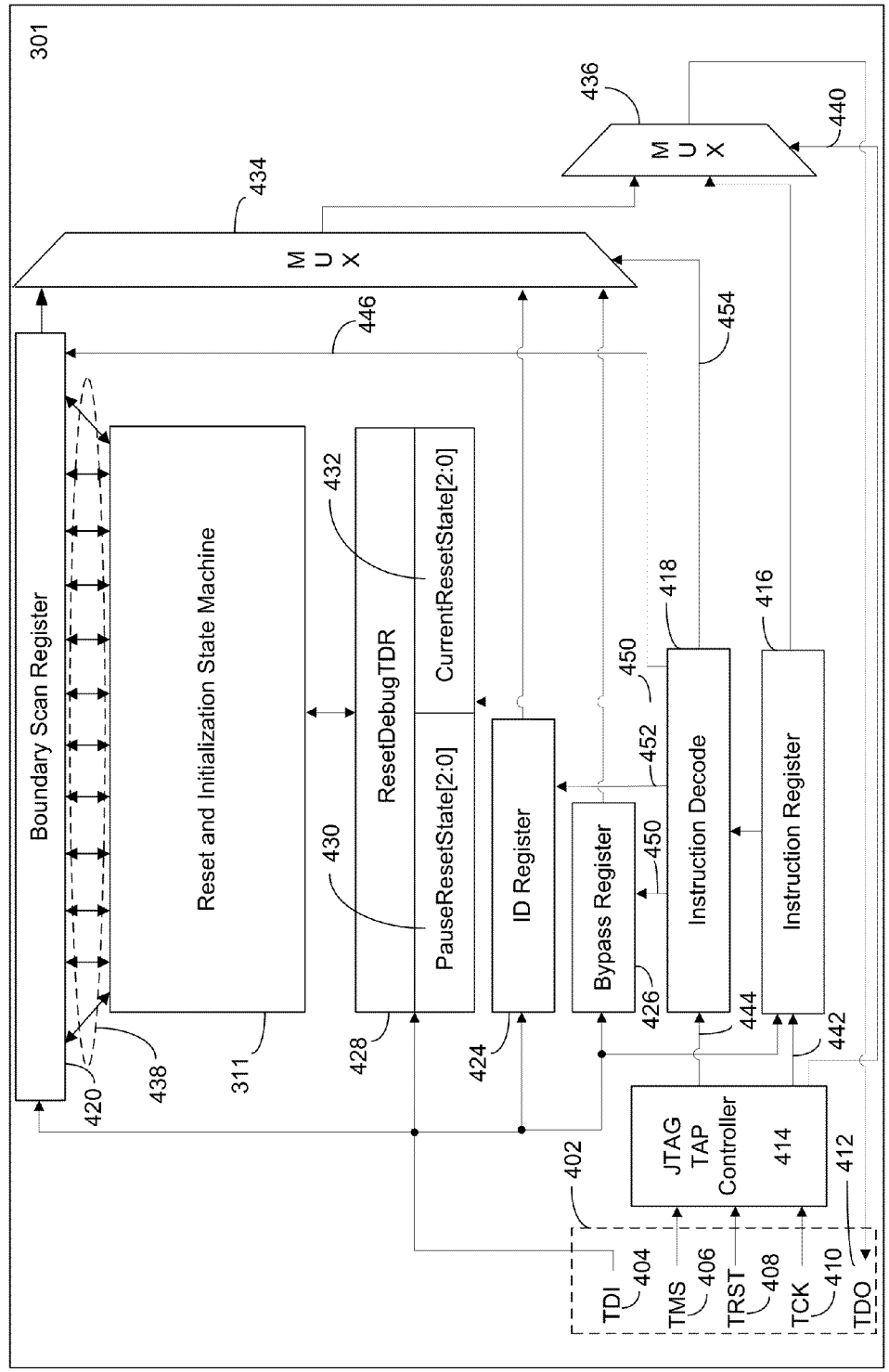
FIG. 4 illustrates an exemplary detailed representation of one embodiment of a reset and initialization unit including an IEEE 1149.1 JTAG-compliant interface according to one embodiment.

Turning now to FIG. 4, a block diagram of the reset and initialization unit 301 having an IEEE-1149.1 compliant JTAG interface 402, in accordance with an embodiment of the present invention, is illustrated. The reset and initialization unit 301 includes a reset and initialization state machine 311 a STAG interface 402, a JTAG test access port (TAP) controller 414, an instruction register 416, an instruction decode unit 418, standardized STAG data registers (a boundary-scan register 420, ID register 424, and bypass register 426), and a user-defined test data register (TDR) (ResetDebugTDR 428). The JTAG interface 402 includes IEEE 1149.1 HAG-compliant input and output signals including a mode signal (TMS) 406, a test clock (TCK) 410, a test data input (TDI) 404, a test data output (TDO) 412, and a test reset input (TRST) 408.

The TDI signal 404 may function as the serial data input to all the registers (e.g., the instruction register 416, the boundary scan register 420, the ID register 424. the bypass register 426 and the ResetDebugTDR register 428). The state of the STAG TAP controller 414 and the instruction loaded into the instruction register 416 may determine which data register (e.g. the boundary scan register 420, the ID register 424, the bypass register 426 and the ResetDebugTDR. register 428) is fed by the TDI signal 404 for any given operation. The TDO signal 412 is the serial data output for all the registers 416 420, 424, 426. 428. The state of the STAG TAP controller 414 and the instruction loaded into the instruction register 416 may determine which register 416, 420, 424, 426, 428 feeds the TDO signal 412 for a specific operation. The output signals of the data registers 416, 420, 424, 426, 428 may be selectively coupled to an output multiplexer 436 through a register selector multiplexer 434 and are ultimately transferred to the host controller 197 (illustrated in FIG. 1) through the TDO signal 412.

Referring still to FIG. 4, the boundary scan register 420 may permit control and observation of various internal logic signals of the reset and initialization state machine 311. When a proper instruction (e.g. the IEEE 1149.1-defined INTEST instruction) is loaded into the instruction register 416, the boundary scan register 420 may capture values from the various internal signals from within reset and, initialization state machine 311 via bus 438. The values of the boundary scan register 420 may then he shifted out back to host controller 197 (shown in FIG. 1) for debug. The bypass register 122 may be a single-bit register that passes information from the TD1 input 404 to the TDO output 412. Generally, the bypass register 426 allows other devices (not shown) that are also connected to a STAG interface (not shown) to he tested in a scan path configuration.

The ResetDebugTDR 428 may be used to debug the reset and initialization state machine 311. The ResetDebugTDR 428 may contain two fields: the PauseResetState[2:0] field 430 and the CurrentResetState[2:0] field 432. The PauseResetState[2:0] field 430 may contain a state encoding that is programmed by the host system 197 using a user-defined instruction. The CurrentResetState[2:0] field may contain the state encoding of the current state of the reset and initialization state machine 311.

Once a state encoding has been programmed in the PauseResetState[2:0] field 430, the state encoding may be forwarded to the reset and initialization state machine 311, The reset and initialization state machine 311 may use the forwarded state encoding as a means to halt itself, For example, when the reset and initialization state machine 311 reaches the state indicated by the state encoding programmed in the PauseResetState[2:0] 430, the reset and initialization state machine 311 may remain in that state. Once the reset and initialization state machine 311 has halted, various debugging tasks may be carried out, The ResetDebugTDR 428 and the reset and initialization state machine 311 will be described in further detail with regard to FIG. 6.

Referring still to FIG. 4, the JTAG TAP controller 414 may be controlled by the host system 197 via the TCK 410, TMS 406, and TRST 408 control signals to generate control signals 440, 442, 444 for the output multiplexer 436, the instruction register 416, and the instruction decoder circuit 418, which is connected to receive instructions from the instruction register 416. In response, the instruction decoder circuit 418 may generate control signals 446, 448, 450, 452 for the data registers 420, 424, 426, 428 and a control signal 454 for the register selector multiplexer 128.

The JTAG TAP controller 414 may be implemented as a finite state machine (FSM), which, depending on the inputs applied, controls the instruction and data storing/loading operations of the instruction register 416 and the data registers 420, 424, 426, 428. As a FSM, the JTAG TAP controller 414 utilizes various inputs to sequence through the various states of the FSM to achieve specific functions. Specifically, the JTAG TAP controller 414 utilizes the TMS signal 406 and the TCK signal 410 to transition between the various states of the JTAG TAP controller 414. The TRST signal 408 may be used to reset the reset and initialization state machine 311. The TMS signal 406 functions as a mode input signal to the JTAG TAP controller 414. At the rising edge of the TCK signal 410, the TMS signal 406 determines the sequence of the JTAG TAP controller 414, The TCK 410 signal provides the clock sequences to the HAG TAP controller 414, as well as all the registers 416, 420, 424, 426, 428.

Figure 5:
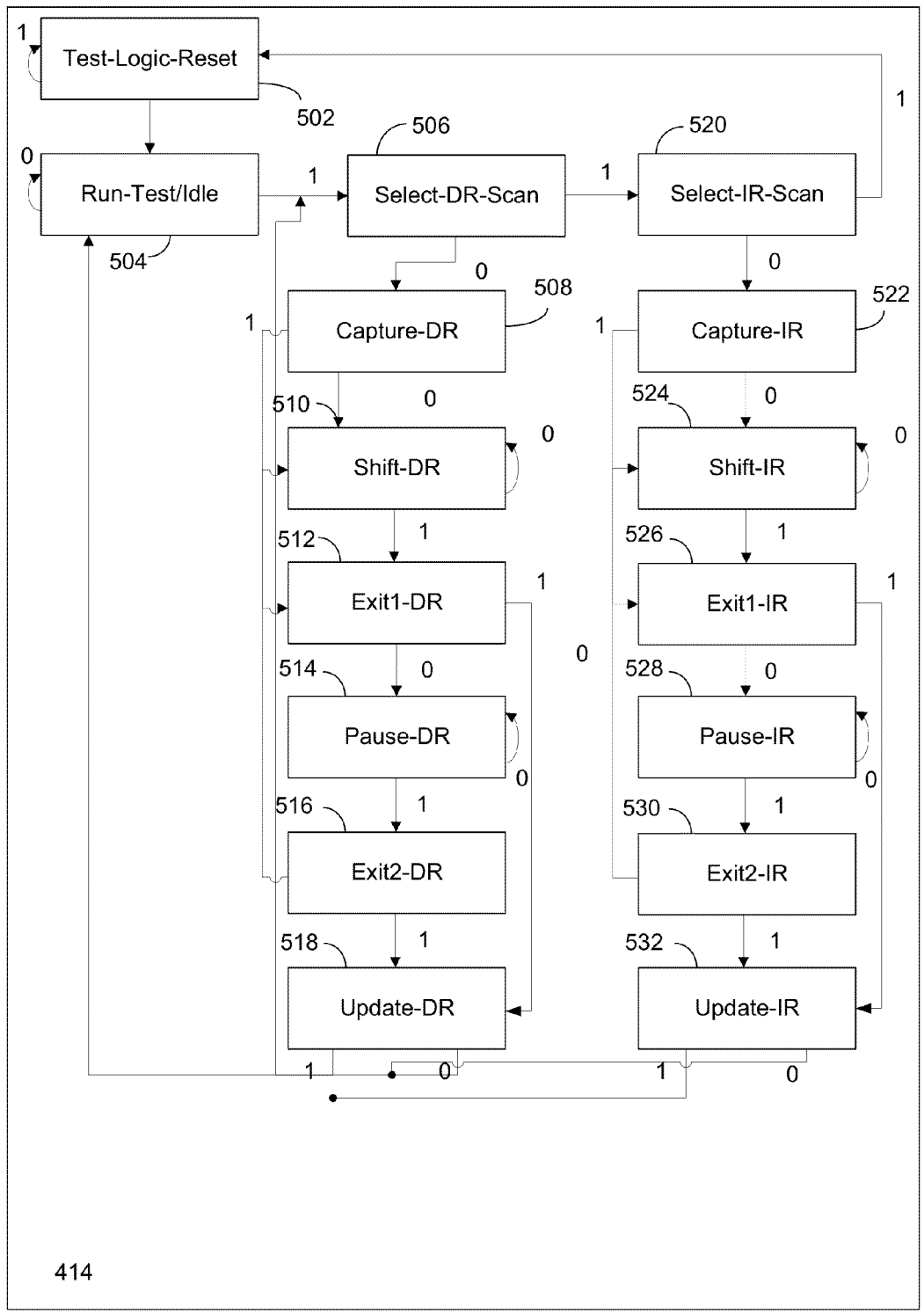
FIG. 5 illustrates a flow chart showing the state diagram of a test access point (TAP) controller of an IEEE 1149.1 JTAG-compliant JTAP controller according to one embodiment of the present invention.

Turning now to FIG. 5, a flow chart showing the state diagram of IEEE 1149.1 compliant JTAG TAP controller 414, in accordance with an embodiment of the present invention, is illustrated. As shown, the JTAG TAP controller 414 may have sixteen states: Test-Logic-Reset 502, Run-Test/Idle 504, Select-DR-Scan 506, Capture-DR 508, Shift-DR 510, Exit1-DR 512, Pause-DR 514, Exit2-DR 516, Update-DR 518, Select-IR-Scan 520, Capture-IR 522, Shift-IR 524, Exit1-IR 526, Pause-IR 528, Exit2-IR 530, and Update-IR 532. The state transitions follow two main paths: an instruction path leading through the Select-IR-Scan 520, Capture-IR 522, Shift-IR 524, Exit 1-IR 526, Pause-IR 528, Exit2-IR 530, and Update-IR 532 states, which load an instruction into the instruction register 416 (shown in FIG. 4), and a data path leading through the Select-DR-Scan 506, Capture-DR 508, Shift-DR 510, Exit1-DR 512, Pause-DR 514, Exit2-DR 516, and Update-DR 518 states, which stores data into the data registers 420, 424, 426, 428 registers (shown in FIG. 4) determined by the instruction stored in the instruction register 416 (shown in FIG. 4).

The digits '0' and '1' in FIG. 5 denote values of the TMS signal 406 (shown in FIG. 4). The JTAG TAP controller 414 changes state according to the value of the TMS signal 406 at the rising edge of the TCK signal 410 (shown in FIG. 4). The state diagram for the HAG TAP controller 414 shown in FIG. 5 is well-defined in the IEEE-1149.1 JTAG specification. Therefore, only a brief description for each of the states is provided below:

Test-Logic-Reset state 502—in this state, the JTAG TAP controller 414 is disabled so that normal operation of the reset and initialization state machine 311 (shown in FIG. 4) can operate unhindered by the JTAG interface 402;

Run-Test-Idle state 504—this state allows idling or pacing of instruction execution;

Select-DR-Scan state 506—this is a temporary state in which the data registers 420, 424, 426, 428 (shown in FIG. 4) selected by a current instruction retains its previous state;

Capture-DR state 508—during this state, data received via the Tat signal 404 (shown in FIG. 4) is loaded into the data register 420, 424, 426, 428 (shown in FIG. 4) selected by the current instruction;

Shift-DR state 510—during this state, the data register 420, 424, 426, 428 (shown in FIG. 4) connected between the TDI input 404 and the TDO output 414 shifts data one stage towards its serial output on each rising edge of the TCK signal 410;

Exit1-DR state 512—this is a temporary state from which a scanning process of the JTAG TAP controller 414 can be terminated or paused;

Pause-DR state 514—during this state, state shifting of a data register 420, 424, 426, 428 (shown in FIG. 4) in the serial path between the TDI input 404 (shown in FIG. 4) and the TDO output (412) is temporarily halted;

Exit2-DR state 516—this is a temporary state from which the HAG TAP controller 414 can enter the Shift-DR state 510 or the Update-DR state 518;

Update-DR state 518—during this state, data is latched onto the output of the selected data register 420, 424, 426, 428 (shown in FIG. 4) from on the falling edge of the TCK. signal 410;

Select-IR-Scan state 520—this is a temporary state in which the instruction register 416 (shown in FIG. 4) retains its previous state;

Capture-IR state 522—during this state, the instruction register 416 (shown in FIG. 4) is loaded with data on the rising edge of the TCK signal 410 (shown in FIG. 4);

Shift-IR state 524—during this state, the instruction register 416 (shown in FIG. 4) is connected between the TDI input 404 (shown in FIG. 4) and the TDO output (shown in FIG. 4) and shifts data one stage towards its serial output on each rising edge of the TCK signal 410 (shown in FIG. 4);

Exit1-IR state 526—this is a temporary state from which a scanning process of the JTAG TAP controller 414 can be terminated or paused;

Pause-IR state 528—during this state, state shifting of a instruction register 416 (shown in FIG. 4) in the serial path between the TD1 input 404 (shown in FIG. 4) and the TDO output (412) is temporarily halted;

Exit2-IR state 530—a temporary state from which the JTAG TAP controller 414 can enter the Shift-IR state 524 or an Update-IR state 530; and Update-IR state 532—during this state, the instruction shifted into the instruction register 411 (shown in FIG. 4) is latched onto the output to become the current instruction.

Figure 6:
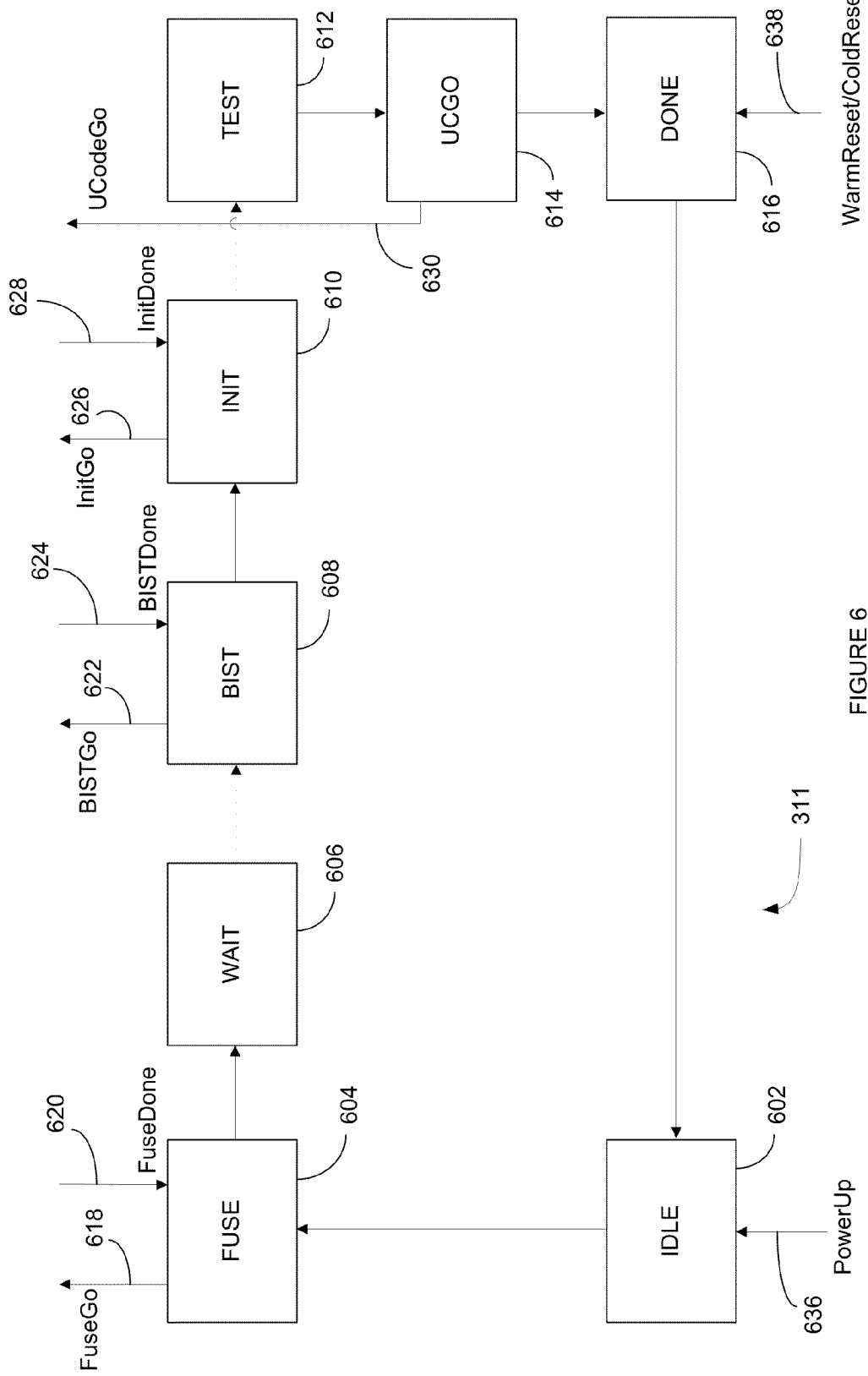
FIG. 6 illustrates a block diagram showing the state diagram of a reset and initialization state machine according to one embodiment of the present invention.

Turning now to FIG. 6, a block diagram showing the state diagram of a reset and initialization state machine 311, in accordance with an embodiment of the present invention, is illustrated. As shown, the reset and initialization state machine 311 may have eight states: IDLE 602, FUSE 604, WAIT 606, BIST 608, INIT 610, TEST 612, UCGO 614, and DONE 616. The IDLE 602 state may be the default state of the reset and initialization state machine 311. The reset and initialization state machine 311 may enter the IDLE state when it receives a PowerUp signal 636 or an asserted reset signal 638 (Le., WarmReset or CoIdReset). When the reset signal 638 is de-asserted, the reset and initialization state machine 311 may transition to the FUSE state 604. During the FUSE state 604, the reset and initialization state machine 311 may assert a "FuseGo" signal 618 to the fuse unit 307. When the fuse unit 307 receives the "FuseGo" signal, the fuse unit 307 may perform fuse operations such as blowing fuses to activate redundant columns and/or rows to replace defective column and/or rows of the caches 324, 326, 328 (shown in FIG. 3) located on the CPU 140 and/or blowing fuses to change other configurations of the CPU 140. While in the FUSE state 604, the reset and initialization state machine 311 may wait for a "FuseDone" signal 620 from the fuse unit 307 before it transitions to the next state. Accordingly, upon receiving the "FuseDone" signal 620, the reset and initialization state machine 311 may transition to the WAIT state 606. The reset and initialization state machine 311 may be configured to stay in the WAIT state 606 for a single clock. As will be described below, the WAIT state 606 may be a state for the reset and initialization state machine 311 to halt in to determine if the FUSE state 604 has completed successfully. After being in the WAIT state 606 for a single clock, the reset and initialization state machine 311 may transition to the BIST state 608. During the BIST state 608, the reset and initialization state machine 311 may assert a "BISTGo" signal 622 to the BIST unit 305 (shown in FIG. 3) of the CPU 140, where various BISTs are performed (e.g., memory BISTs, cache BISTs, and the like). Once the BIST unit 305 has successfully finished the BISTs, the BIST unit 305 may transmit a "BIST-Done" signal 624 to the reset and initialization state machine 311. Once the reset and initialization state machine receives the "BISTDone" signal 624 from the BIST unit 305, the reset and initialization state machine 311 may transition to the INIT state 610. Once in the IN state 610, the reset and initialization state machine 311 may assert an "InitGo" signal 626 to initialization logic (not shown) of the CPU 140, where various initializations to the CPU 140 (e.g., resetting various flip-flops throughout the CPU 140) are performed. While in the INIT state 610, the reset and initialization state machine 311 may wait for an "InitDone" signal. 628 from the initialization logic before it transitions to the next state. Accordingly, upon receiving the "InitDone" signal 628, the reset and initialization state machine 311 may transition to the TEST state 612. The reset and initialization state machine 311 may be configured to stay in the TEST state 612 for a single clock, As will be described below, the TEST state 612 may be a state for the reset and initialization state machine 311 to halt in to determine if the INIT state 610 has completed successfully. Further, when the reset and initialzation state machine 311 reaches the TEST state 612, the CPU 140 may be in a fully-functional state, and therefore, capable of executing software. After being in the TEST state 612 for a single clock, the reset and initialization state machine 311 may transition to the UCGO state 614. Once in the UCGO state 614, the reset and initialization state machine 311 may assert a "LiCodeGo" signal 630 to the CPU core 302, which causes the CPU core 302 to fetch a microcoded-sequence from a microcode ROM (not shown). The microcoded sequence may perform various operations directed to various components in the computer system 100 (shown in FIG. 1) other than CPU 140, such as the northbridge 145 (shown in FIG. 1). The reset and initialization state machine 311 may be configured to stay in the UCGO state 614 for a single clock. Accordingly, after being in the UCGO state 614 for a single clock, the reset and initialization state machine 311 may transition to the DONE state 616. The reset and initialization state machine 311 may stay in the DONE state 616 until the reset signal 638 is re-asserted, In one embodiment, the reset and initialization state machine 311 may be configured to halt in any given state of the reset and initialization state machine 311 by using the ResetDebugTDR register 428 (shown in FIG. 4). For example (with reference to FIG. 4), the PauseResetState[2:0] field 430 of the ResetDebugTDR register 428 may be programmed with a state encoding matching one of the eight states of the reset and initialization state machine 311. The reset and initialization state machine 311 may contain logic to compare the state encoding stored in the PauseResetState[2:0] field 430 in the ResetDebugTDR register 428 with reset and initialization state machine's 311 current state. If the state encoding stored in the PauseResetState[2:0] 430 field matches with the current state of the reset and initialization state machine 311, the reset and initialization state machine 311 may halt in that state. In doing so, it may be determined which states of the reset and initialization state machine 311 have been executed correctly. For example, if the PauseResetDebug[2:0] field 430 is programmed with a state encoding of the WAIT state 606, and the reset and initialization state machine 311 halts in the WAIT state 606, then it may be determined that the FUSE state 604 executed properly. Similarly, if the PauseResetDebug[2:0] field 430 is programmed with a state encoding of the TEST state 612, and the reset and initialization state machine 311 halts in the TEST state 612, then it may he determined that the states preceding the test TEST state (e.g., the FUSE state 604, the WAIT state 608, the BIST state 608, and the NIT state 610) executed properly.

In one embodiment, the state encoding of the current state of the reset and initialization state machine 311 and the "Done" signals 620, 624, 628 may be connected to the boundary-scan register 420 (shown in FIG. 4). In doing so, the current state of the reset and initialization state machine 311 and the "Done" signals 620, 624, 628 may be captured and shifted out (via the TDO output 412 (shown in FIG. 4)) to the host system 197 (shown in FIG. 1) for debugging. in another embodiment, the state encoding of the current state of the reset and initialization state machine 311 may be captured in the CurrentResetState[2:0] field 432 of ResetDebugTDR register 428. In this case, the host system 197 (shown in FIG. 1) may poll the CurrentResetState[2:0] field 432 (e.g., by initiating a user-defined JTAG instruction to shift out the contents of the ResetDebugTDR register 428) to determine if the state encoding programmed in the PauseResetState[2:0] field 430 has been reached.

Figure 7:
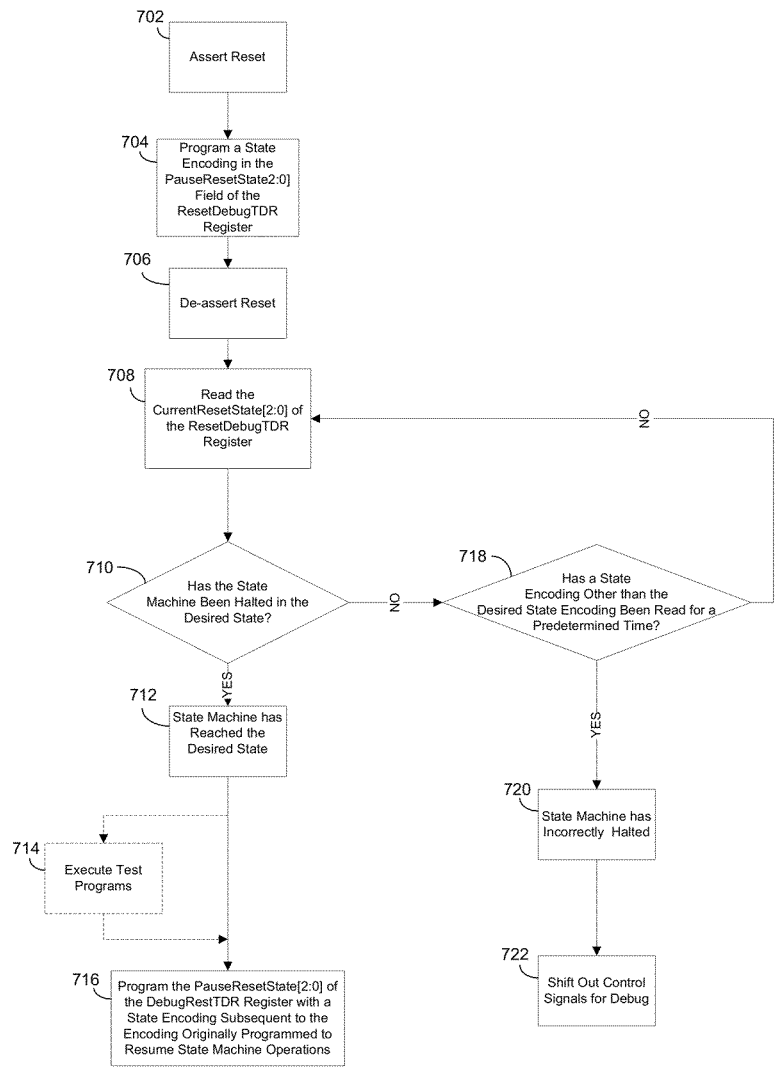
FIG. 7 illustrates a flowchart for debugging the reset and initialization state machine according to one embodiment of the present invention.

Turning now to FIG. 7, a flowchart for debugging the reset and initialization state machine 311, in accordance with an embodiment of the present invention, is illustrated. The operations begin at step 702, where the reset signal 638 may be asserted to the CPU 140. At step 704, While the reset signal 638 is still asserted, the PauseResetState[2:0] field 430 of the ResetDebugTDR register 428 may be programmed with a state encoding of the reset and initialization state machine 311. The state encoding may represent the desired state in which the reset and initialization state machine 311 is to be halted. At step 706, the reset may be de-asserted, thereby starting operations for the reset and initializations state machine 311. At step 708, the host system 197 may read the CurrentResetState[2:0] field 432 of the ResetDebugTDR register 428. At step 710, the host system 197 determines if the reset and initialization state machine 311 has halted in the desired state by comparing the state encoding stored in the CurrentResetState[2:0] 432 to the state encoding stored in the PauseResetState[2:0] field 430. if the state encodings match, then, at step 712, it may be determined that the reset and initialization state machine 311 has halted in the desired state, and therefore executed correctly.

In one embodiment, at step 714, the host system 197 may execute test programs once the reset and initialization state machine 311 has been halted. For example, if the reset and initialization state machine 311 is programmed to halt in the TEST state 612, the host system 197 may be able to execute test programs once the reset and initialization state machine 311 reaches the TEST state 612 because the CPU 140 will be in a fully functional state capable executing software. In addition, at this stage of the reset and initialization process, the CPU 140 has yet to initiate any transactions to other components such as the northbridge 145 (shown in FIG. 1) or the southbridge 150 (shown in FIG. 1). Therefore, it may be desirable to execute test programs (e.g., additional BISTs) before the CPU 140 has had an opportunity to initiate such transactions.

In any case, after the reset and initialization state machine 311 has been halted, at step 716, the host system 197 may direct the reset and initialization state machine 311 to resume operations by programming the PauseResetState[2:0] 430 register with a state encoding subsequent to the encoding originally programmed (assuming that a state encoding for the DONE state 616 was not previously programmed). The reset and initialization state machine 311 may continue operations until it reaches the state matching the new state encoding programmed in the PauseResetState[2:0] 430. For example, if the host system 197 originally programmed the PauseResetDebug[2:0] field. 430 with the state encoding of the TEST state 612, the host system 197 would program the PauseResetDebug[2:0] field 430 with a state encoding representing either the UCGO state 614 or DONE 616 state to resume operations for the reset and initialization state machine 311. If the state encoding for the UCGO state 614 is programmed in the PauseResetDebug[2:0] field 430, then the reset and initialization state machine 311 will halt in the UCGO state 614 when it is reached. On the other hand, if the state encoding for the DONE state 616 is programmed in the PauseResetDebug[2:0] field 430, the reset and initialization state machine 311 will resume operations until the DONE state 614 is reached.

Returning to step 710, if the desired state encoding has not been read from the CurrentResetState[2:0] field 432 (i.e., the CurrentResetState[2:0] field 432 contains a state encoding other than the state encoding programmed in the PauseResetState[2:0] field 428) then, at step 718, the host system 197 may determine if a state encoding other than the desired state encoding has been read from the CurrentResetState[2:0] field 432 for a predetermined time (i.e., determine if the reset and initialization state machine 311 has incorrectly halted in a state other than the desired state). if a state encoding other than the desired state encoding has not been read from the CurrentResetState[2:0] field 432 for a predetermined time, then operations return to step 708, where the CurrentResetState[2:0] field 432 is read. However, if a state encoding other than the desired state encoding has been read from the CurrentResetState[2:0] field 432 for a predetermined time, then, at step 720, it may be determined that the reset and initialization state machine 311 has incorrectly halted. In response, at step 722., control signals, such as the various "Done" signals 620, 624, 628 may be shifted out (via the TDO output 412) to the host system 197 for debug. Using the state encoding from the CurrentResetState[2:0] field 432 and the various "Done" signals 620, 624, 628, the state in which the reset and initialization state machine 311 has incorrectly halted may be determined, and the associated logic (e.g. the BIST unit 305, the fuse unit 307, and/or the initialization logic (not shown)) possibly causing the halt may be identified. For example, if the CurrentResetState[2:0] field 432 contains a state encoding representing the INIT state 610, and the "InitDone" signal 628 is not asserted, it may be determined that the initialization sequence (initiated by the "InitGo" signal 626) never finished. properly, and therefore, conclude that a problem exists in the initialization logic (not shown). if the CurrentResetState[2:0] field 432 contains a state encoding representing the BIST state 608 and the "BistDone" signal 624 is not asserted, then it may be determined that the BISTs (initiated by the "BistGo" signal 622) never completed, and therefore, conclude that a problem exists in the BIST unit 305. If CurrentResetState[2:0] contains a state encoding representing the FUSE state 604 and the "FuseDone" signal 620 is not asserted, then it may be determined that the fuse unit 307 (initiated by the "FuseGo" signal 618) never completed the fuse loading, and therefore, conclude that a problem exists in tie fuse unit 307.

Figure 8:
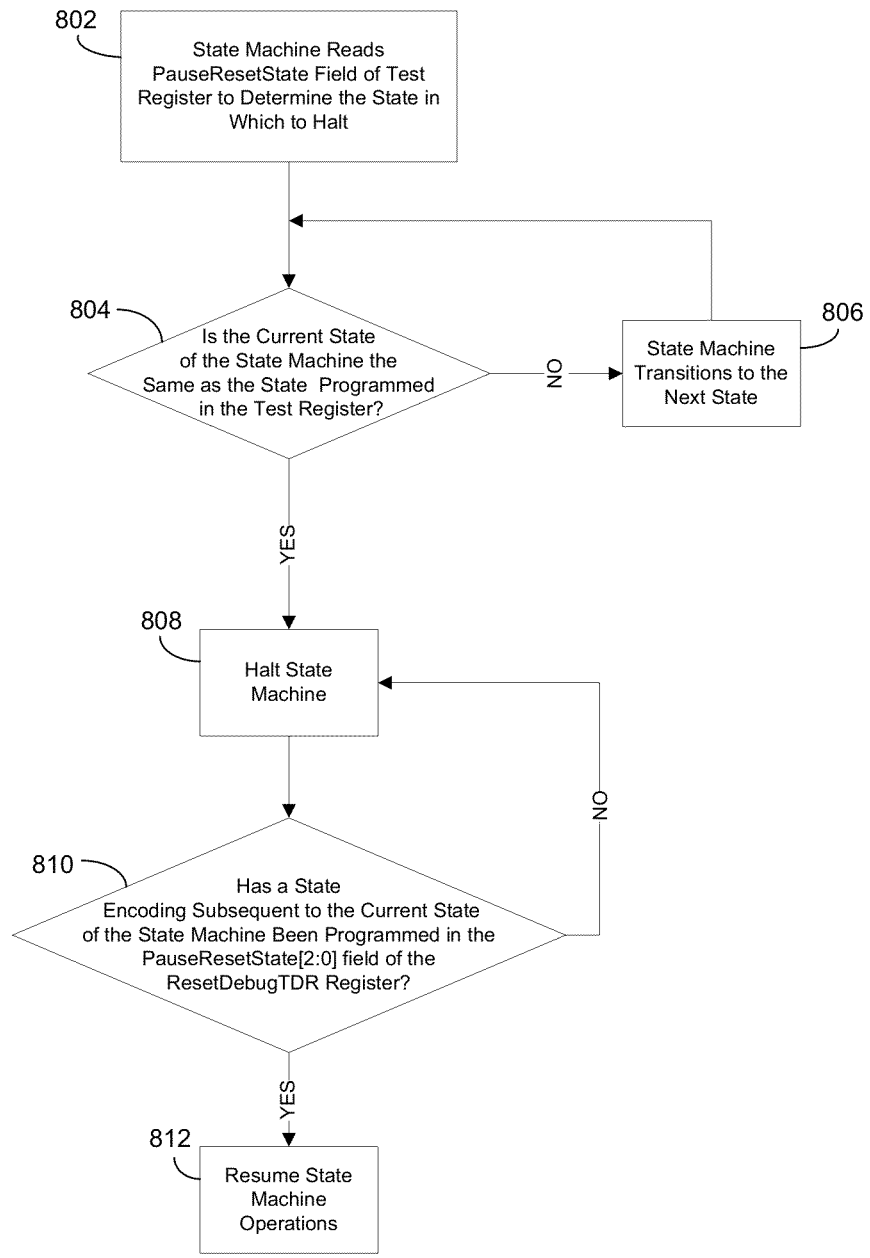
FIG. 8 illustrates a flowchart for operations performed by the reset and initialization state machine provided in FIG. 6 for halting and resuming the reset and initialization state machine according to one embodiment of the present invention.

Turning now to FIG. 8, a flowchart for operations performed by reset and initialization state machine 311 for halting and resuming the reset and initialization state machine 311, in accordance with an embodiment of the present invention, is illustrated. The operations begin at step 802, where the reset and initialization state machine 311 reads the PauseResetState[2:0] field 430 of the ResetDebugTDR register 428 to determine the state in which to halt. At step 804, the reset and initialization state machine 311 determines if its current state is equal to the state encoding programmed in the PauseResetState[2:0] field 430. If the current state is not equal to the state encoding programmed in the PauseResetState[2:0] field 430, then at step 806, the reset and initialization state machine 311 transitions to the next state. Thereafter, the operations return to step 804.

However, if, at step 804, the current state of the reset and initialization state machine 311 is equal to the state encoding programmed in the PauseResetState[2:0] field 430, then, at step 808, the reset and initialization state machine 311 is halted. At step 810, the reset and initialization state machine 311 may determine if a state encoding subsequent to its current state has been programmed in the PauseResetState[2:0] field 430. If a state encoding subsequent to the reset and initialization state machine's 311 current state has been programmed, then, at step 812, the reset and initialization state machine 311 may resume operations until it reaches the newly-programmed state encoding. On the other hand, if a state encoding subsequent to the current state of reset and initialization state machine 311 has not been programmed, then the reset and initialization state machine 311 remains halted at step 808.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing 10T bitcells 500, 10T bitcell arrays 420 and/or array banks 410 may be created using the GDSII data (or other similar data).

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:
1. A method comprising:
transmitting a first test data, which identifies a first state of a state machine, wherein the state machine performs reset and initialization operations for a processor;
receiving a second test data, which identifies a second state of the state machine; and
determining that the state machine has halted if the first test data is equal to the second test data.
2. The method of claim 1, further comprising:
determining that the state machine has incorrectly halted if the second test data is not equal to a the first test data for a predetermined time period; and
receiving a third test data upon determining that the state machine has incorrectly halted.
3. The method of claim 2, wherein the third test data comprises control signals.
4. The method of claim 3, wherein the control signals identify completed operations initiated by the state machine.
5. The method of claim 1, wherein the first state identified by the first test data is a state in which to halt the state machine.
6. The method of claim 1, wherein the second state identified by the second test data is a current state of the state machine.
7. The method of claim 1, wherein the first test data and the second test data are stored in a JTAG test. data register.

8. A method, comprising:
- receiving a first test data, which identifies a state of a state machine, wherein the state performs reset and initialization operations for a processor;
- hafting the state machine in the state identified by the first test data upon reaching the state; and
- transmitting a second test data, which identifies a current state of the state machine.

9. The method of claim 8, wherein the second test data is transmitted to a JTAG test data register.

10. The method of claim 8, further comprising:
- receiving a third test data, which identifies a state subsequent to the state identified by the first test data; and
- upon receiving the third test data, resuming the state machine.

11. The method of claim 10, wherein the third test data is received from a JTAG test data register.

12. An apparatus, comprising:
- a processor configured to:
  - receive a first test data which identifies a state of a state machine wherein the state machine performs reset and initialization operations for a processor;
  - halt the state machine in the state identified by the first test data upon reaching the state, and
  - transmit a second test data, which identifies a current state of the state machine.

13. The apparatus of claim 12, wherein the second test data is transmitted data to a JTAG test data register.

14. The apparatus of claim 12, wherein the processor is further configured to:
- receive a third test data, which identifies a state subsequent to the state identified by the first test data; and
- upon receiving the third test data, resume the state machine.

15. The apparatus of claim 14, wherein the third test data is received from a JTAG test data register.

16. A non-transitory computer readable storage medium encoded with data that, when implemented in a manufacturing facility, adapts the manufacturing facility to create an apparatus, comprising:
- a processor configured to:
  - receive a first test data. which identifies a state of a state machine, wherein the state machine performs reset and initialization operations for a processor;
  - halt the state machine in the state identified by the first test data upon reaching the state; and
  - transmit a second test data, which identifies a current state of the state machine.

17. The non-transitory computer readable storage medium of claim 16, wherein the second test data is transmitted data to a JTAG test data register.

18. The non-transitory computer readable storage medium of claim 16, wherein the processor is further configured to:
- receive a third test data, which identifies a state subsequent to the state identified by the first test data; and
- upon receiving the third test data, resume the state machine.

19. The non-transitory computer readable storage medium of claim 18, wherein the third test data is received from a JTAG test data register.

* * * * *